(12) United States Patent
Braitberg et al.

(10) Patent No.: US 6,631,359 B1
(45) Date of Patent: Oct. 7, 2003

(54) WRITEABLE MEDIUM ACCESS CONTROL USING A MEDIUM WRITEABLE AREA

(75) Inventors: Michael F. Braitberg, Boulder, CO (US); Steven B. Volk, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/393,150

(22) Filed: Sep. 10, 1999

(51) Int. Cl.$^7$ ............................................. G06F 17/60
(52) U.S. Cl. ............................ 705/50; 705/51; 705/57; 705/400
(58) Field of Search ................................ 705/1, 50, 51, 705/52, 56, 57, 400

(56) References Cited

U.S. PATENT DOCUMENTS

| | | |
|---|---|---|
| 3,530,441 A | 9/1970 | Ovshinsky .................. 340/173 |
| 3,868,651 A | 2/1975 | Ovshinsky .................. 340/173 |
| 3,983,542 A | 9/1976 | Ovshinsky .................. 340/173 |
| 4,205,387 A | 5/1980 | Ovshinsky et al. .......... 364/900 |
| 4,542,495 A | 9/1985 | Ziegler et al. .............. 369/273 |
| 4,571,718 A | 2/1986 | Cahill et al. ................ 369/291 |
| 4,577,289 A | 3/1986 | Comerford et al. .......... 364/900 |
| 4,647,944 A | 3/1987 | Gravesteijn et al. ......... 346/1.1 |
| 4,710,899 A | 12/1987 | Young et al. ............... 365/113 |
| 4,872,156 A | 10/1989 | Steenbergen et al. ....... 369/275 |
| 4,945,530 A | 7/1990 | Sandell et al. ............. 369/291 |
| 4,953,209 A | 8/1990 | Ryder, Sr. et al. ........... 380/23 |
| 4,960,680 A | 10/1990 | Pan et al. .................. 430/346 |
| 5,060,106 A | 10/1991 | Davis et al. ................ 360/133 |
| 5,063,547 A | * 11/1991 | Custers et al. ............... 369/32 |
| 5,063,558 A | 11/1991 | Takahaski .................. 369/291 |
| 5,073,889 A | 12/1991 | Rayner ...................... 369/291 |
| 5,077,726 A | 12/1991 | Dodds et al. .............. 369/291 |
| 5,103,476 A | 4/1992 | Waite et al. ................. 380/4 |
| 5,128,099 A | 7/1992 | Strand et al. .............. 420/579 |

(List continued on next page.)

FOREIGN PATENT DOCUMENTS

EP     0920013 A1   *   6/1997

OTHER PUBLICATIONS

"CD–ROM Popularity Reinforced at FED MICRO '93": Optical Memory News, Sep. 14, 1993, n145.*

Primary Examiner—Edward R. Cosimano
(74) Attorney, Agent, or Firm—MacPherson Kwok Chen & Heid LLP

(57) ABSTRACT

An optical medium uses a single structure or format (such as identical materials, layers and the like) for both a region for holding information content-mastered data and a writeable area. In one aspect, a writeable region of a medium with information content-mastered data is used in connection with paying, collecting or accounting for usage or royalties for proprietary intellectual property embodied in or associated with the content. In one embodiment, a key permitting access to some or all content, preferably when combined with a disk serial number, is stored in the writeable area, which is preferably user-inaccessible.

66 Claims, 7 Drawing Sheets

U.S. PATENT DOCUMENTS

| | | | |
|---|---|---|---|
| 5,146,552 A | 9/1992 | Cassorla et al. | 395/145 |
| 5,247,575 A | 9/1993 | Sprague et al. | 380/9 |
| 5,271,978 A | 12/1993 | Vazan et al. | 428/64 |
| 5,272,693 A | 12/1993 | Fujisawa | 369/291 |
| 5,280,467 A | 1/1994 | Wanger et al. | 369/275.5 |
| 5,323,380 A | 6/1994 | Oda et al. | 369/275.1 |
| 5,331,627 A | 7/1994 | Childers et al. | 369/291 |
| 5,339,091 A | 8/1994 | Yamazaki et al. | 345/104 |
| 5,379,266 A | 1/1995 | Russell | 365/234 |
| 5,436,871 A | 7/1995 | Russell | 365/234 |
| 5,447,768 A | 9/1995 | Takahashi | 428/66.6 |
| 5,465,238 A | 11/1995 | Russell | 365/234 |
| 5,475,399 A | 12/1995 | Borsuk | 345/130 |
| 5,511,035 A | 4/1996 | Russell | 365/234 |
| 5,511,058 A | 4/1996 | Visel et al. | 369/103 |
| 5,532,920 A | 7/1996 | Hartrick et al. | 364/419.1 |
| 5,534,385 A | 7/1996 | Spahn | 430/270.13 |
| 5,541,888 A | 7/1996 | Russell | 365/234 |
| 5,555,304 A | 9/1996 | Hasebe et al. | 380/4 |
| 5,563,947 A | 10/1996 | Kikinis | 380/4 |
| 5,581,540 A | 12/1996 | Dang | 369/291 |
| 5,587,994 A | 12/1996 | Nagaura et al. | 369/291 |
| 5,591,501 A | 1/1997 | Ovshinsky et al. | 428/64.1 |
| 5,610,902 A | 3/1997 | Childers et al. | 369/289 |
| 5,619,488 A | 4/1997 | Ota et al. | 369/112 |
| 5,629,980 A | 5/1997 | Stefik et al. | 380/4 |
| 5,638,241 A | 6/1997 | Sonderegger | 360/133 |
| 5,654,856 A | 8/1997 | Akiyama et al. | 360/133 |
| 5,696,714 A | 12/1997 | Russell | 365/106 |
| 5,703,951 A | 12/1997 | Dolphin | 380/25 |
| 5,719,850 A | 2/1998 | Yoshioka et al. | 369/283 |
| 5,719,972 A | 2/1998 | Caron et al. | 385/18 |
| 5,726,971 A | 3/1998 | Wanger et al. | 369/291 |
| 5,732,058 A | 3/1998 | Iwamura et al. | 369/75.2 |
| 5,737,300 A | 4/1998 | Ota et al. | 369/112 |
| 5,748,609 A | 5/1998 | Tanaka | 369/291 |
| 5,757,584 A | 5/1998 | Schick | 360/99.08 |
| 5,757,908 A | 5/1998 | Cooper et al. | 380/4 |
| 5,764,603 A | 6/1998 | Glaser-Inbari | 369/44.23 |
| 5,765,152 A | 6/1998 | Erickson | 707/9 |
| 5,768,241 A | 6/1998 | Kanazawa et al. | 369/77.2 |
| 5,793,584 A | 8/1998 | Knight et al. | 360/133 |
| 5,793,742 A | 8/1998 | Sandell et al. | 369/291 |
| 5,796,697 A | 8/1998 | Masaki et al. | 369/75.2 |
| 5,799,157 A | 8/1998 | Escallon | 395/227 |
| 5,808,986 A | 9/1998 | Jewell et al. | 369/44.37 |
| 5,812,519 A | 9/1998 | Kawamura et al. | 369/275.1 |
| 5,828,482 A | 10/1998 | Jain | 359/211 |
| 5,831,967 A | 11/1998 | Otsuka et al. | 369/291 |
| 5,831,968 A | 11/1998 | Tanaka | 369/291 |
| 5,838,653 A | 11/1998 | Fan et al. | 369/275.1 |
| 5,850,384 A | 12/1998 | Ohmori et al. | 369/291 |
| 5,857,021 A | 1/1999 | Kataoka et al. | 380/4 |
| 5,859,829 A | 1/1999 | Otsuka et al. | 369/77.2 |
| 5,859,831 A | 1/1999 | Naito et al. | 369/291 |
| 5,870,364 A | 2/1999 | Raczynski | 369/47 |
| 5,876,823 A | 3/1999 | Nagashima | 428/64.1 |
| 5,881,038 A | 3/1999 | Oshima et al. | 369/59 |
| 5,886,979 A | 3/1999 | Moribe et al. | 369/275.3 |
| 5,892,825 A | 4/1999 | Mages et al. | 380/3 |
| 5,897,324 A | 4/1999 | Tan | 434/317 |
| 5,912,786 A | 6/1999 | Nicklos et al. | 360/99.09 |
| 5,930,074 A | 7/1999 | Nicklos | 360/99.06 |
| 5,930,215 A | 7/1999 | Fite et al. | 369/58 |
| 5,946,282 A | 8/1999 | Hirono et al. | 369/112 |
| 5,949,601 A | 9/1999 | Braithwaite et al. | 360/60 |
| 5,963,532 A | 10/1999 | Hajjar | 369/112 |
| 6,285,764 B1 * | 9/2001 | Gotoh et al. | 380/203 |
| 6,289,102 B1 * | 9/2001 | Uea et al. | 713/100 |

\* cited by examiner

# WRITEABLE MEDIUM ACCESS CONTROL USING A MEDIUM WRITEABLE AREA

CROSS-REFERENCE TO RELATED APPLICATIONS

Cross-reference is made to U.S. application Ser. No. 09/315,398, filed May 29, 1999, U.S. application Ser. No. 09/527,982, filed Mar. 17, 2000, and U.S. application Ser. No. 09/393,899, filed on even date herewith, all application are co-pending and incorporated herein by reference.

The present invention is directed to an apparatus and process providing distribution of text, audio, video or other content on a medium such as an optical disk storage medium which includes both information content-mastered regions and recordable regions (writeable regions) and in particular to a small-format, lightweight apparatus and method of use, for distributing content on disks to facilitate either or both of buying and selling (with appropriate royalty payments for proprietary intellectual property) and/or annotation correction or revision of the content, e.g., using the writeable area.

BACKGROUND INFORMATION

A number of benefits can be achieved using a medium which can readily and economically provide both content-mastered information and the ability to write or record information. As used herein, "information content-mastered" refers to a medium in which content is provided on the medium before it reaches the user. A common example is music CD's in which the music is information content-mastered ("ICM") prior to distribution to users. Information written onto the same medium which contains ICM can be useful, e.g., in any of a number of systems for accounting for or collecting usage fees, royalties or similar charges for use of proprietary intellectual property in such content, including systems involving use of the Internet (or other communications systems), thus effectively providing a device which is not only an electronic book, music or multimedia player or similar content-output device, but also effectively an Internet appliance (i.e., an apparatus which can operate, at least partially, in connection with information obtained using the Internet or similar communication system).

Many previous attempts to provide ICM and writeable portions on the same medium have encountered or resulted in various problems. Some data storage media are pre-recorded only in a serial fashion, such that it is not possible or feasible to produce the entire content at one time. A typical example (albeit, involving analog, rather than digital, encoding) is the pre-recording of audio tapes which, even if recorded at high speed and/or simultaneously recording multiple tracks, were generally recorded serially, i.e., beginning at one physical end of the tape and recorded along the length of the tape to the other end. In general, the amount of time required for such serial pre-recording can render the process substantially economically unattractive. Accordingly, it would be useful to provide a system, apparatus and method involving both ICM and writeable portions wherein the mastered content is provided in the medium substantially all at once.

Many systems that involve writeable media are unsuitable for archival or other long-term or secure storage, either because the written information is re-writeable (e.g., typical CD-RW media) or because the information tends to degrade in a relatively short time period (or both). Accordingly it would be useful to provide a system, apparatus and method involving both ICM and writeable portions in which, if desired, the writeable portions can be provided in a form which is not re-writeable or erasable, and/or which is relatively long-lived, so as to provide archival information storage, e.g., storage for about ten years or more substantially without information loss.

Although there are techniques for mastering content all at once (such as stamping or pressing of vinyl audio recordings or injection molding of compact disks (CDs) and the like), the techniques and materials used in these processes are generally different from those used for providing writeable areas. Although it is possible to provide, e.g., a dye-based or other writeable optical disk with some data thereon pre-recorded, typically the pre-recorded data on a dye-based CD must be serially recorded. Accordingly, previous approaches, in order to provide both parallel-written, content-mastered information and writeable areas were required to have different (e.g. masked) regions for these two different types of areas and/or different materials and techniques, such as an optical disk having an inner radial area with molded mastered content and an outer radial area with writeable dye media. Media with two different regions of material have proved to be expensive and unreliable to produce. Moreover, the techniques, machinery and materials for producing such a two-medium storage device would typically predetermine the relative amount of ICM, versus writeable, area and thus was relatively inflexible such that changing the relative proportion of ICM and writeable area would require substantial retooling or redesign of fabrication processes. Accordingly it would be useful to provide a system, apparatus and method achieving parallel-written ICM material and writeable regions on a single-medium substrate, preferably such that the materials and techniques for the two areas used for forming the two areas are substantially the same, with the areas differing substantially only as to whether the region has content molded (i.e. embossed, or otherwise mastered) therein.

Furthermore, many systems require different sets or ranges of optical parameters for reading ICM data versus reading later-written data and/or for reading ICM data versus writing data. In some cases this means that two or more sets of optical apparatus (such as two different wavelengths of laser, powers of laser, optical trains or optical arms or the like) must be provided in a single playback and/or read/write drive. Accordingly, it would be advantageous to provide an apparatus system and method using a medium which has both parallel-written ICM data and writeable areas, but which can be used (for reproduction and/or writing) using a single optical train or optical arm, a single and/or a single wavelength of light.

SUMMARY OF THE INVENTION

The present invention includes a recognition of the existence and nature of certain problems in previous approaches, including as described herein.

In one embodiment, an optical medium uses a single structure or format (such as identical materials, layers and the like) for both a region for holding ICM data, e.g., data which is written substantially all at once or in parallel, and for defining a writeable area, such as a user-writeable area. In one embodiment the ICM data is provided by an injection molding process. In one embodiment the data layer is a phase change layer including a phase change film. One suitable medium is described in application Ser. No. 09/315,398, supra, incorporated herein by reference. In one embodiment the medium has a high data density of about 26 Gigabit per square inch of data surface. By providing a high data density of this type, the present invention can provide for both a relatively large amount of ICM data and a relatively large amount of writeable area, e.g., totaling about 0.25 Gigabytes or more on one side of an optical disk, while providing a small form factor, such as a disk with a -diameter less than about 35 millimeters. In this way, it is possible, for example, to provide a disk which can include uncompressed text data equivalent to about 45 or more 1000-page books, plus a writeable area sufficient to accommodate about 5000 or more pages of annotations, comments, revisions, etc., on a disk having a diameter of about 35 millimeters. Preferably the writeable area, if desired, can be formed in a fashion such that information written therein is not normally re-writeable or erasable. Preferably the data, including later-written material is archival in nature such as having a expected data integrity life time of at least about 10 years or more.

In one embodiment a writeable region of a medium with ICM data is used in connection with paying, collecting or accounting for usage or royalties for proprietary intellectual property embodied in or associated with the content. According to one aspect, at least some of the ICM data is unavailable for display, playback or other reproduction or use until a user has entered a key or code (e.g., a code with which the user receives an exchange for a payment). For example, some or all of the ICM data may be encrypted and the key or code may form some or all of the information needed for decrypting the ICM data. Such code-enabled access to ICM data can be provided in conjunction with the writeable area of the medium in a number of fashions. In one embodiment, it is desired to provide for access to the ICM data which is limited or restricted in one or more of a variety of fashions, such as being limited to use on a particular playback device, limited to use by a particular user or person, limited to a certain number of playbacks, limited to a predetermined time period of playback, limited to using a particular geographic location or site, or combinations thereof and the like. For example, the system can be configured such that, in response to a user's entry of an access code, the system will record, into the writeable area, information pertinent to the license (or other use rights) for the ICM or other data. For example, when use is to be limited to a particular playback device, the system can be configured such that a processor serial number, playback device serial number, (secret) key or other identifier of the playback device is recorded into the writeable area. Thereafter, before reproducing the ICM data, the system will verify that the identifier for the playback device matches an identifier recorded on the writeable area. In some embodiments, information providing playback rights for a second playback device may be recorded into the writeable area, usually in addition to or in place of the original playback device identifier, e.g., in response to entry of a second access code (such as provided in exchange for a second royalty or other payment).

In one embodiment, the (preferably write-once) writeable area can be used for storing later-written information such as annotations, highlighting, reordering, remixing, modifications, supplements, collections, additions, bookmarks, cross references, hypertext or hyperlinks and the like. Preferably, annotations and similar materials can be associated, by the user, with particular portions or content of the ICM data. For example, when the ICM data includes some or all portions of a text book or similar academic or teaching content, a student or other user may preferably insert notes or annotations e.g. taken during lectures, for later review which will preferably be displayed (or available) adjacent the content to which such notes or annotations refer or relate. In one embodiment, some or all of the annotations may be effectively blocked from viewing by a second user (such as another student who licenses the ICM data at a later time). Preferably the annotations or similar material can be indexed, searched, modified, linked, and the like. In one embodiment the medium, as distributed to users, includes executable programs, such as search engine programs (e.g. for use in searching ICM data or other items), database programs (e.g. for use in organizing or accessing ICM data or other items) and/or programs related to decryption (or other copy protection functions) or annotations (or similar later-written information). In this way, the media can be self-executing, and/or platform independent, in the sense that users can perform desired functions or operations without having to separately acquire and load software for performing such functions. Preferably, techniques are included in the disk data format to prevent binary copies.

DETAILED DESCRIPTION OF THE INVENTION

Figure 1A:
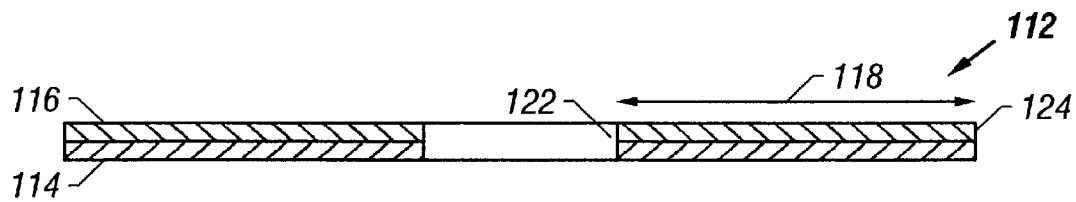
FIG. 1A is a cross sectional view of an optical disk without molded content, according to one embodiment of the present invention.

According to one embodiment of the invention, a data recording medium such as an optical disk is provided which can be configured to have both ICM data and one or more writeable areas. In one embodiment the disk is a first surface, writeable medium generally as described in application Ser. No. 09/315,398, supra, incorporated herein by reference.

An understanding of features of the present invention is facilitated by considering the invention in the context of a Data Device Model, having certain similarities to the International Standards Organization (ISO) network model. The Data Device Model is compared to the ISO model in Table

I.

TABLE I

| The ISO Model: | The Data Device Model: |
|---|---|
| Layer 7 Applications and Services | |
| Layer 6 Presentation | } Applications and Services |
| Layer 5 Session | |
| Layer 4 Transport Layer | Host Interface Layer |
| Layer 3 Network Layer | Data Controller Layer |
| Layer 2 Data Link Layer | Data Link Layer |
| Layer 1 Physical Layer | Physical Layer |

As seen from Table I, the Data Device Model is a five layer model generally relating to layers 1–4 and 7 of the ISO telecommunications model at the left. Generally, levels 5 through 7 if the ISO model are system specific and vary considerably. They are often simplified to a single layer (as is done in the Data Device Model. Data flows bidirectionally between layers using predetermined protocols and each layer is only concerned with transactions between layers directly above and below it.

The Physical Layer of the Data Device Model deals with physical media and the signals that represent 1's and 0's. It relates to the physical representation of the data via pits, marks, grooves, lands, physical modulation, reflective spots, photochromic marks, bubbles, magneto-optical regions, magnetic domains, and the like. Included in the Physical Layer is the process of reading and writing data which may be accomplished using optical, magnetic or thermal means, or a combination of methods and detection schemes such as phase detection, amplitude detection, reflectivity, polarization, and the like. The content of the data is irrelevant at the Physical Layer, although modulation schemes, e.g., optimized for the media, and read/write compensation methods, if provided, are included in this layer. For an optical disk drive, items such as focus servo, track following servo and random-access servo information features and information (which are used by the Data Link Layer but not necessarily by layers above the Data Link Layer) are part of the Physical Layer.

At the Data Link Layer of the Data Device Model, the data is organized into units typically called frames. The Data Link Layer is concerned with the transmission and reception of data frames. To do so this layer must modulate/demodulate, encode/decode, and provide servo information to the Data Controller Layer. Each frame has a header (address) that includes physical location and embedded control information. A data link is a point to point communication connection consisting of the media and data send (write) or receive (read) link. At the Data Link Layer, data has embedded codes representing data boundaries, frame numbers, header information, etc. Some of these data are used solely by the link, and others are passed to higher information layers. Information is coded using methods appropriate to the media. Information transferred at the Data Link Layer would include, e.g., user binary files including those which are prerecorded or written to the disk.

The Data Controller Layer of the Data Device Model is concerned with the selection, extraction, and management of binary files between the source (data on a disk, for example) and destination (host computer, for example). The Data Controller Layer resolves the logical and physical location of the information stored on the disk. Services include data detection, demodulation, framing, interleaving, ECC processes, and Data Link Layer formatting. Data is encoded and packetized or extracted and stripped to create or extract user binary file information. The Data Controller Layer may extract or embed information management codes in the frame information. This layer provides servo algorithms and control systems for the proper operation of the link layer. Drive control information is parsed from the Host Interface Layer. The Data Controller Layer preferably provides intelligent cache management and may also provide encryption/decryption and key management services.

In the Host Interface Layer of the Data Device Model, binary files are transferred between the host and the drive via a high level, typically public, communication interface. Examples of this interface are USB, SCSI, ESDI, and the like. Data access commands such as seek, read, write, identification, information key request, and power management may be passed between the host and the drive.

The Applications and Services Layer of the Data Device Model, is concerned with manipulation of binary files by the host and, in principal, does not include or require drive related processes except those involving the host interface. Examples of these processes are file transfers, file manipulation, application software, user interface, and network communications, which generate specific command and control information to and from the drive in order to manage maintain and transfer binary files.

As depicted in FIG. 1A, in the absence of ICM data, the disk 112 has a substrate 114 and a I recording layer 116. The recording layer 116 may be vertically monolithic 6r may be made up of a plurality of films. Preferably, the recording layer 116 includes materials and structure of such a nature that mastered material may be formed in a substantially parallel fashion, i.e. such that substantially all of the mastered material is provided at one time. In one embodiment, an injection molding process is used for providing mastered material. Preferably, the recording layer 116 is also of such a nature that some or all of at least those areas which are not ICM, are writeable. Examples of recording layers having these characteristics are described in application Ser. No. 09/315,398 supra. As depicted in FIG. 1A, in one embodiment a first radial extent 118 of the disk 112 has such a recording layer thereon. Although, in the depiction of FIG. 1A, the radial extent 118 is depicted as extending through the entirety of the region from the central opening 122 to the outer edge 124, the particular read and/or write formats or procedures used in connection with the disk 112 may and/or fabrication procedures may result in certain areas, e.g., radially adjacent the central opening 122 or edge 124, being provided without recording layer materials 116 and/or with recording layer material 116 which is not used and/or not usable for mastered content or writeable areas. In one embodiment, the disk 112 is of such a nature that, if no portion of the radial extent 118 contains ICM, then the entire radial extent 118 would, at least theoretically, be writeable (although a particular read/write technology used in connection with the disk may mean that certain areas or portions of the radial extent 118 are reserved for formatting, tracks, grooves, servo or similar items and thus are normally unavailable for user writing). Preferably, the recording layer 116 of FIG. 1A is of such a nature that substantially any portion thereof may be parallel-written with ICM data.

Figure 1B:
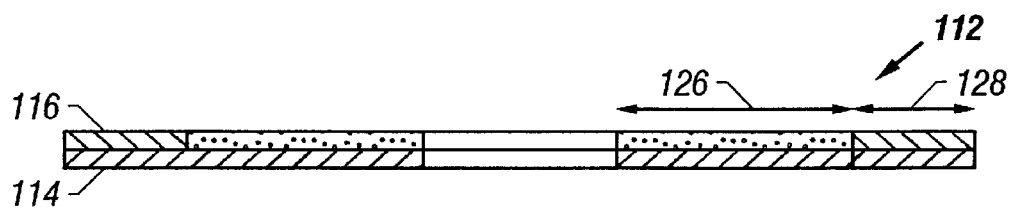
FIG. 1B is a cross sectional view of an optical disk with molded content, according to one embodiment of the present invention.

In one embodiment, ICM data is provided in a radial extent 126 (FIG. 1B) by a molding process. Preferably the ICM data is digital content and the molding provides optically-readable bits (using any of a plurality in coding techniques, including, error correction or error correctable coding, run link limited coding, and similar techniques as will be understood by those of skill in the art after understanding the present invention). Although FIG. 1B depicts a single radial extent 126 being used for the ICM data, it is possible to distribute ICM data on the disk 112 in a number of fashions including a plurality of spaced-apart radial extents or "tracks" one or more continuous spiral regions, circumferential regions or frames, multiple layers, regions on both disk surfaces and the like. Preferably, substantially all portions of the recording layer radial extent 118 which are not ICM (such as by molding and the like) are regions that are available for writing (such as radial region 128 in the example depicted in FIG. 1B).

In one embodiment, the same molding procedure which provides the ICM data in area 126 is also used to provide formatting, frames, focus, tracking and/or test areas (e.g. for uses as described above in connection with the Physical Layer of the Data Device Model) in the (otherwise) writeable region of the disk 112. Although both Physical Layer features such as formatting, frames, focus, tracking or test features or areas and the like and ICM data can arguably be considered to store or convey information, they can be distinguished at least in terms of which layers they reach. ICM data, as used herein, refers to data which can reach at least the Data Controller Layer, and, typically, the Applications and Services Layer (possibly with appropriate reformatting, decoding, etc., as described in connection with the Data Device Model), whereas, in general, information or features of the Physical Layer which can not reach above the Data Link Layer (such as frames or formatting information) are not considered ICM data.

In one embodiment, the disk 112 is available for use following the molding procedure. In another embodiment, additional steps are provided following the molding procedure such as coating with a preferably thin (e.g. less than about 100 nm) protective material, hardening, curing, or other coating steps and the like. In some embodiments, information (such as information which will not be the same on all the media) is written in the writeable areas before distribution to the user, e.g. by the manufacturer and/or distributor. Information can include some or all of a serial number (or other identifier), date and/or time of manufacture, encryption/decryption information and the like. For certain types of written information, it is preferred that the information should be write-once (such as serial number or encryption/decryption information).

The relative portion of the initial radial extent 118 which is devoted to ICM, versus writeable, regions can be distributed in any a number of fashions, depending on, e.g., the anticipated use for the writeable region 128. For example, if it is anticipated that the writeable region 128 is to be used only for security, licensing, decryption and similar purposes (e.g. as described below) a relatively small portion, such as less than 5%, preferably less than about 1%, can be devoted to writeable area. If, however, it is anticipated that extensive updates, corrections, annotations (possibly from two or more different users) and the like will be written, then a relatively larger portion 128 for the writeable area may be desired, such as about 5 to 10% or more.

Figure 4:
FIG. 4 is a cross-sectional view illustrating one example of storage of data on a disk according to an embodiment of the present invention.

A number of systems can be used for storing data on a disk in accordance with the present invention. FIG. 4 shows one possibility for data storage, for purposes of illustrating one example, and those of skill in the art will understand how to provide other data storage systems, after understanding the present invention. It is common (although not necessary), in optical disk systems, for initial tracks to be in radially inward locations. In the example illustrated in FIG. 4, radially inward portions 412 are used as a drive management area. A drive management area can be used for storing items such as a, preferably unique, disk identifier (e-g. a serial number), an area for storing access or unlocking information, a Table of Contents or other indexing system for the main writeable area 414, drive calibration regions (e.g., test regions for determining and/or storing optimal or preferred read/write power settings for this disk), and the like. In one embodiment, the writeable area 414 can be zoned by the user (e.g., drive ID). Radially outward of the main writeable area 414, in the illustrated embodiment, is a ICM disk information region 416. The ICM disk information region 416 can be used for storing items such as a Table of Contents or other indexing system for the ICM data 418, an indication of available writeable area, manufacturer information, type of content, information on how the disk can be used and/or how to obtain access to content e.g., how to get the disk unlocked, so that, for example, the naive user can receive appropriate instructions.

Preferably the medium 112 is relatively small and lightweight and is compatible with use in connection with a reader, player or read/write drive which is also relatively small and lightweight. Preferably the disk is less than about 35 millimeters in diameter and is useable in connection with the drive having a width less than about 52 mm, a thickness less than about 10 mm and a depth less than about 40 mm, generally as described in application Ser. No. 09/315,398, supra. Preferably, the medium 112 has relatively high data capacity such as storing about 0.25 Gigabytes or more, generally as described in application Ser. No. 09/315,398, supra. Preferably, the disk 112, and the drive useable in connection with disk 112, is sufficiently small and lightweight as to the useable in connection a portable electronic device (PBD) such as described in application Ser. No. 09/315,398, supra, and including players for so-called electronic books. Advantageously, the ICM data provided on media according to the present invention are substantially smaller and less massive than corresponding traditional media. For example, media according to the present invention used for providing so-called "electronic books" are substantially lighter and smaller than traditional print books, even when including the size and mass of a reader device therefor. In one embodiment, the reader device includes at least some electronic memory. Preferably, multiple texts (or other content) can use the same memory, as opposed to flash memory-based devices such as many digital cameras and/or audio playback devices such as MP3 which typically use conventional flash memory techniques not allowing multiple contents to use at the same memory and, typically, forcing users to purchase multiple (relatively expensive) flash memories and/or to discard content to make room in the flash memory.

Figure 2:
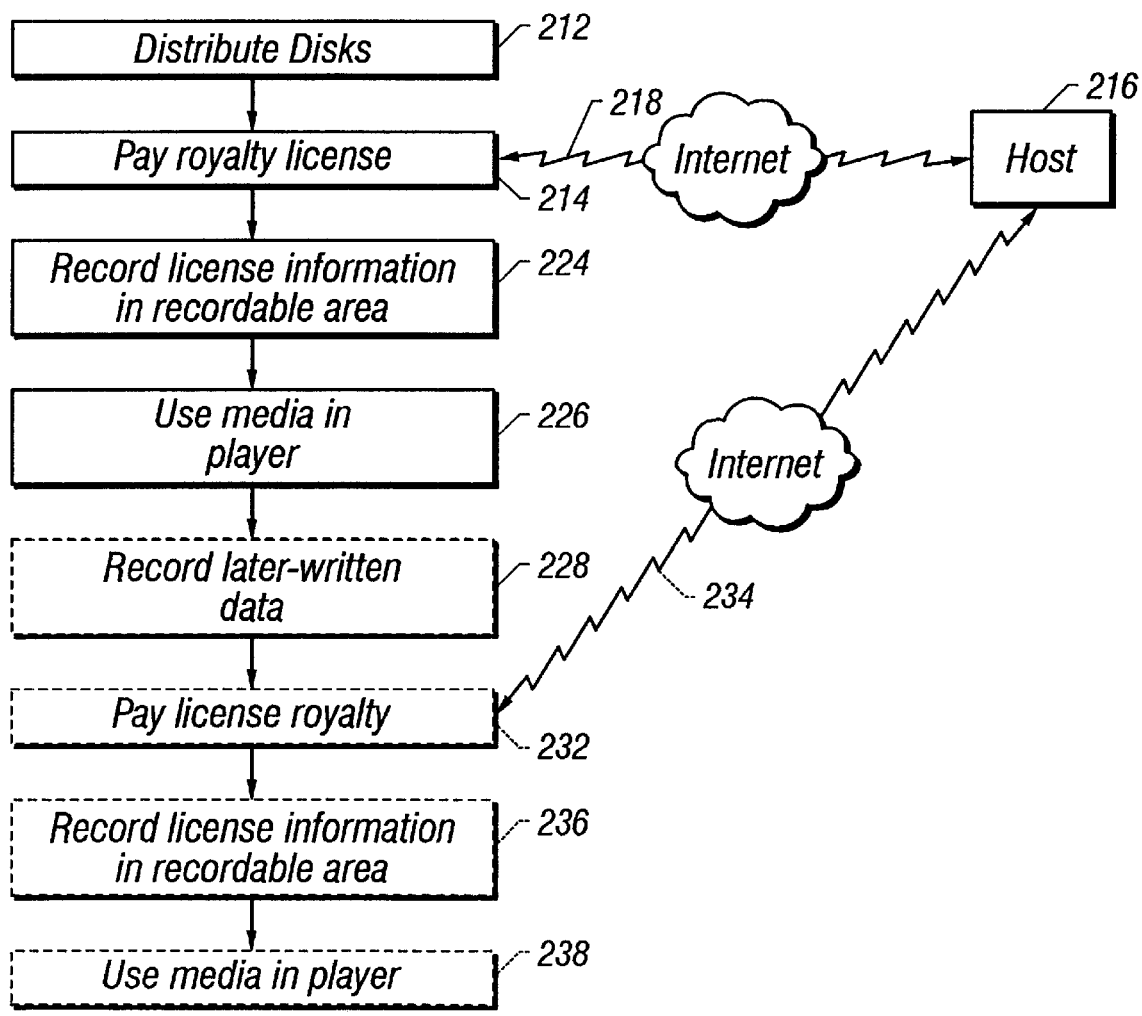
FIG. 2 is a flow chart depicting a media use procedure according to an embodiment of the present invention.

As depicted in FIG. 2, according to one embodiment of the present invention, disks having ICM data and writeable areas are distributed to users or potential users 212. A number of distribution systems and procedures can be used. It is possible to distribute such disks at conventional retail locations similar to bookstores or recorded music stores. Such distributed disks may be distributed without any use licenses, or with limited-use licenses, or may be distributed with full or substantial use licenses, typically including a royalty or use fee for covering the type and extent of license provided therewith. It is possible that different disks may be encoded with different types of licenses and/or restriction (typically each with a different cost so that a user may select which type of licenses desired, considering the various costs). The license information is preferably encoded on the medium either as part of the ICM information, or written into the writeable area, e.g. by the retail location, or both. The types of licenses or restriction that are available can include (without limitation) licenses for a particular number of uses or playbacks, licenses limited to a particular user or a particular playback machine (e.g. keyed to a user password, user key card or other token and the like), limited to a particular time period, a particular geographic location and the like. If it is desired, in some embodiments or systems, a user may be offered an opportunity to buy the copy rather than license the ICM data, typically at a substantially higher cost, but with substantially no restrictions on use or resale.

In other systems, the medium may be distributed in such a fashion that some or all of the potential license rights are not provided or available at the time of distribution but may be requested or acquired at a later time. For example, in one embodiment, media may be distributed, such as mass distributed, e.g. by mailing and the like, to subscribers or potential subscribers, to potential users who have requested the media, or in an unsolicited fashion. In one embodiment such mass-distributed media has at least some ICM data which is encrypted or otherwise not available without the input of an access code which, typically, will be available only for a payment. In some such embodiments, certain portions of the ICM media may be accessible, on a full or limited basis, without a fee. For example, a book club may mass-distribute disks having one or more books thereon in encrypted form and corresponding book review, author interviews, advertisements, promotion, selected chapters or other portions and the like available in unencrypted form. Preferably, users may then choose to obtain a license, which may be any of the types of licenses described above or other types of licenses, in exchange for a payment, whereupon the user will be provided with one or more access codes for obtaining access to one or more books. Similar procedures can be used for other types of ICM data including still images, movie pictures or videos, data for use by computers such as personal computers, laptops, work stations and the like, storage for music or other audio purposes, including storage for MP3 players, motion picture, home video or other video storage purposes, voice data, computer programs and/or data, personal information or data such as medical data, identification, password or encryption/decryption data, credit information, credit or debit card information and the like. Indeed, it is believed that it will be particularly advantageous to provide for use of the present invention in a wide variety of devices, e.g. to provide for ease of sharing, storing or transmitting of data, e.g. between platforms including, but not limited to devices for play-back, communication or reproduction of data (including, e.g. image, video or music data), such as personal stereo or other personal (or fixed) music reproduction devices, portable or fixed television or video reproduction devices, computer peripheral devices, computer game devices, gaming or gambling devices, still, video or motion picture cameras, automobile stereos or other audio or video devices, purchase or distribution devices such as automatic teller machines or other bank machines, vending machines, and the like.

Figure 5:
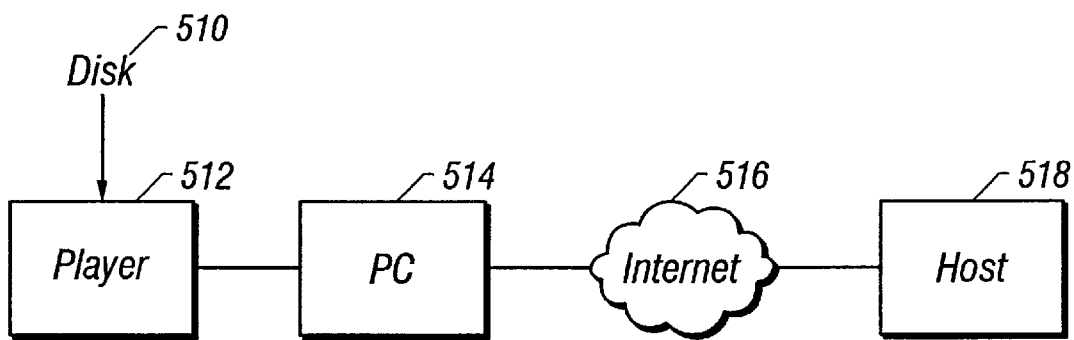
FIG. 5 is a block diagram of a system according to an embodiment of the present invention.

In one embodiment, the user may select among different types of licenses or restrictions, each associated with different prices or levels of cost. In one embodiment, the license may be content-limited such as providing the opportunity to select between accessing, text-only, for a first fee, accessing text and graphics for a second fee, accessing text, graphics and video for a third fee, accessing text and audio for a fourth fee, accessing commentary and text for a fifth fee and combinations and permutations thereof. In one embodiment, licensees or potential licensees may obtain desired licenses and/or access codes in a remote-fashion over the Internet, over a telephone system and the like. In one embodiment, the drive, player 512 (FIG. 5), read/write device, electronic book player, video player, audio player and the like and/or a personal computer or other computer 514 coupled thereto, is configured for reproducing the ICM data and is configured for such remote access, such as being configured for land-line, cellular telephone or other wireless connection, satellite connection, local area network connection or other connection to a host computer 518, such as a host for a web site e.g., via the Internet 516 for obtaining an access code or license. In one embodiment, some or all portions of the processes involved in obtaining the license or access code are automated. For example, in one embodiment a user receiving such a disk 510 may choose to simply access desired portions of the disk and, in response, the player or other apparatus according to the present invention will, at that time, or at a later time, access a remote site e.g., via the Internet and/or via a telephone or satellite link, so as to arrange for license fee payments or royalty payments such as by charging a predetermined credit card or other charge account, arranging for ordinary billing, charging a telephone, cable television service or other utility service account and the like. In one embodiment, authorization by the user is requested or required before such automated billing or charging is performed.

Figure 6A:
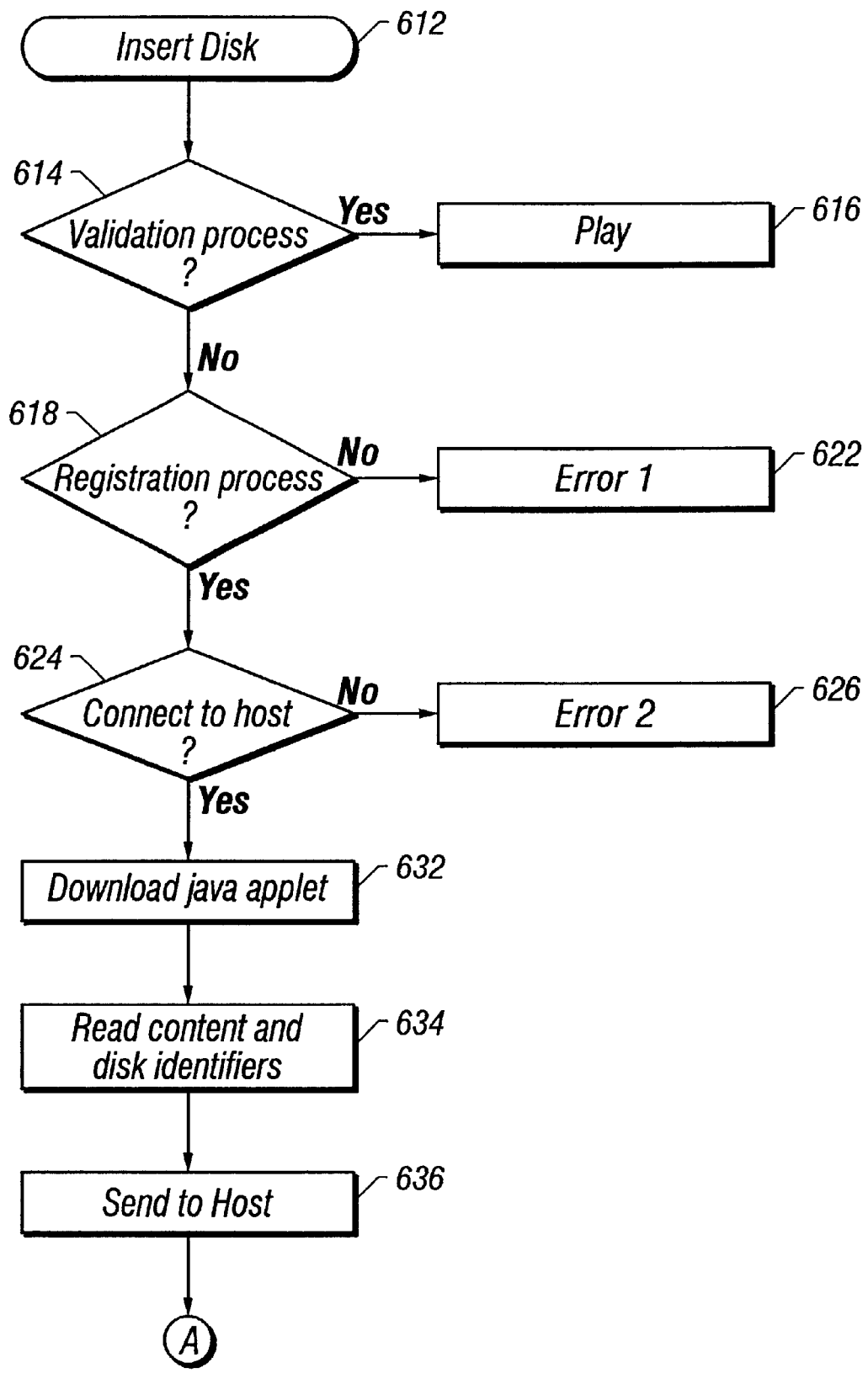
FIGS. 6A and 6B show a flow chart of a process according to an embodiment of the present invention.
Figure 6B:
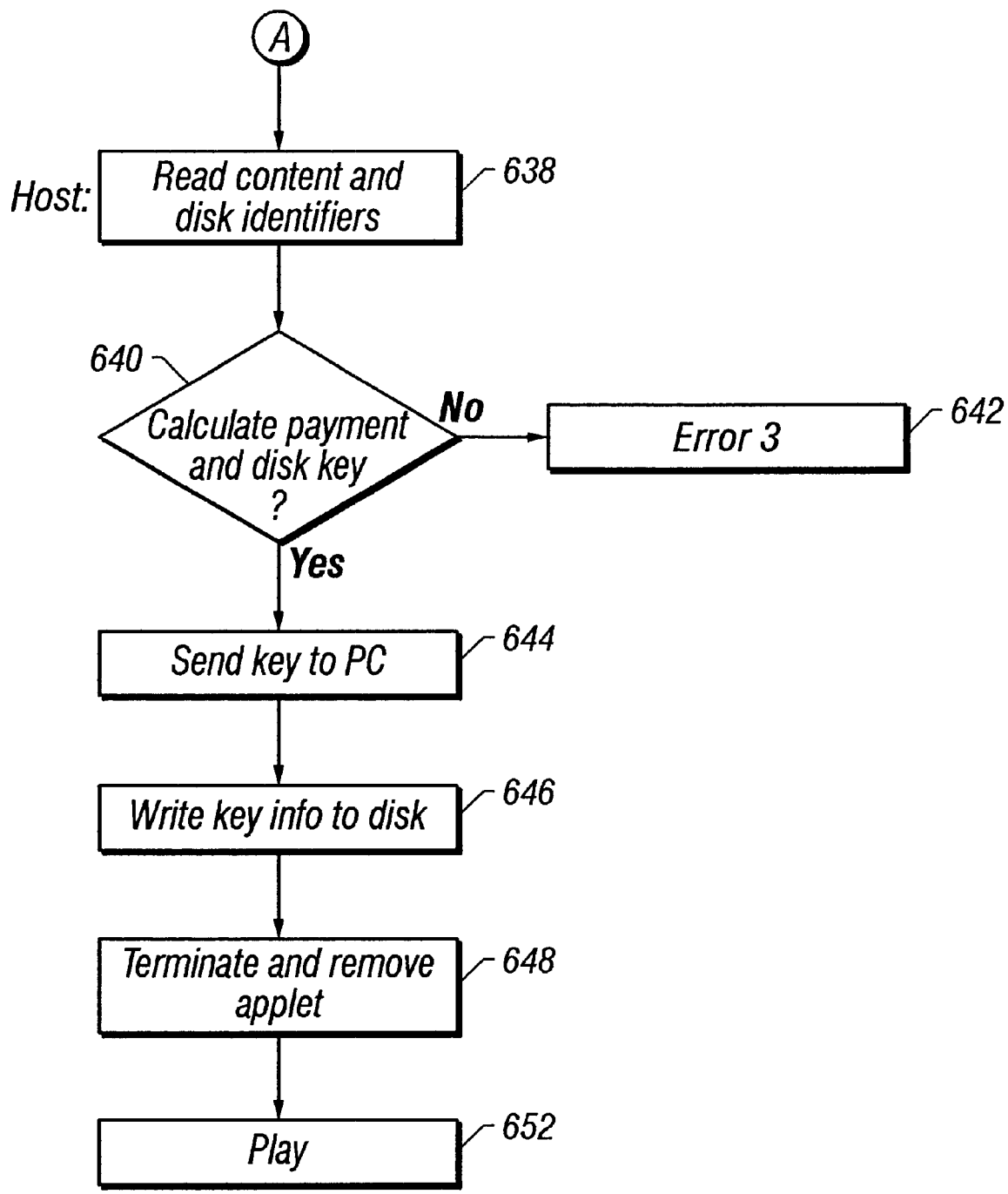

In the embodiment depicted in FIGS. 6A and 6B, a user inserts a disk 612. Preferably, each disk has a unique, or nearly unique, serial number or other identifier Serial numbers are preferably located in a user inaccessible read zone. In the depicted embodiment, the reader initiates a key validation process 614. Preferably this involves performing a predefined calculation or combination based on the serial number and a first code (if one exists) which has preferably been recorded on the disk, preferably in the user inaccessible zone. Many types of combinations are possible, including hash numbers, prime number multiplications or compound number factoring, and the like. Other combinations will be understood by those of skill in the art after understanding the present invention. The result of the combination will be an access code which the player is configured to interpret so as to determine which if any portions of the content on the disk can be played or otherwise accessed.

In one particular validation process, the disk drive reads the disk serial number or ID and the recorded key value (if any) from the non-copyable zone of the disk. Preferably, the drive has a microprocessor which executes microcode for performing validation in the drive. The drive computes a master key using the disk identifier and the key value. If the master key indicates that access is approved, the disk is enabled, such as by enabling content decryption processes, enabling read protected directory or the like.

If the desired portions are validated, the player proceeds to play (or otherwise access) the content 616. If the desired content is not validated, the player preferably initiates a registration process 618, e.g., requesting user identity, credit card information and the like. If the registration process is not complete, an error is declared 622, e.g., for errorhandling. Otherwise, an application program interface (API) presents key and content information to a host 518 by contacting the host 624, e.g., via the Internet 516. If the contact is unsuccessful, an error is declared 628, e.g., for error handling. If the contact is successful, in the depicted embodiment, software, such as a JAVA or similar applet is downloaded from the "point-of-sale" host, 632. It is also possible to provide the appropriate software on the media. In the depicted embodiment, the downloaded applet reads the appropriate disk content and serial number or other disk identifier 634 and sends this information to the host 636. The host reads such content 638 and calculates the payment amount and the disk key 640. If payment is refused or the step otherwise does not complete, an error is declared 642 for error handling. Otherwise the host sends the calculated access key 644 to the user's "client" PC 514 which presents it to the API. The player 512 computes the validation key (if necessary) and writes the key information to the disk 646, (e.g., writing the key value, a hash function or other related information) preferably in a non-copyable zone, and the applet is terminated and removed 648. With the proper codes now recorded on the disk, the desired content is played 652, either in the original player 510 or any other player configured to recognize the validation key or other code. It is possible, however to configure a disk such that the validation key will permit playing only on one player (or a defined set of players).

In this embodiment, if a copy is made of the disk 510, validation or acess codes based on data store in the source disk will not permit access to content in the copy. However, the copy can be enable by inserting in a reader and following the process described above for paying to obtain an appropriate validation key.

Figure 7A:
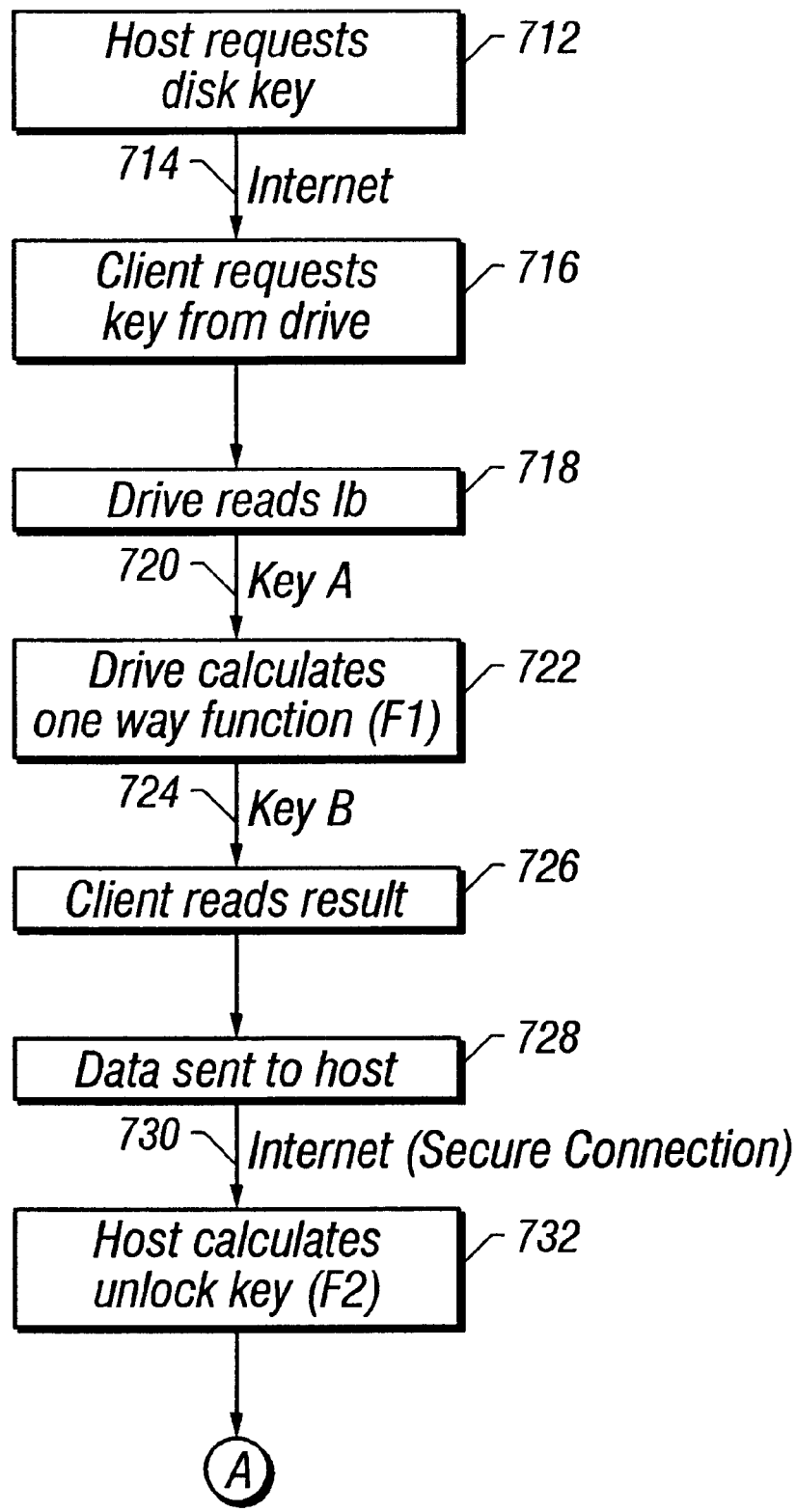
FIGS. 7A and 7B show a flow chart illustrating a content enablement process according to an embodiment of the present invention.
Figure 7B:
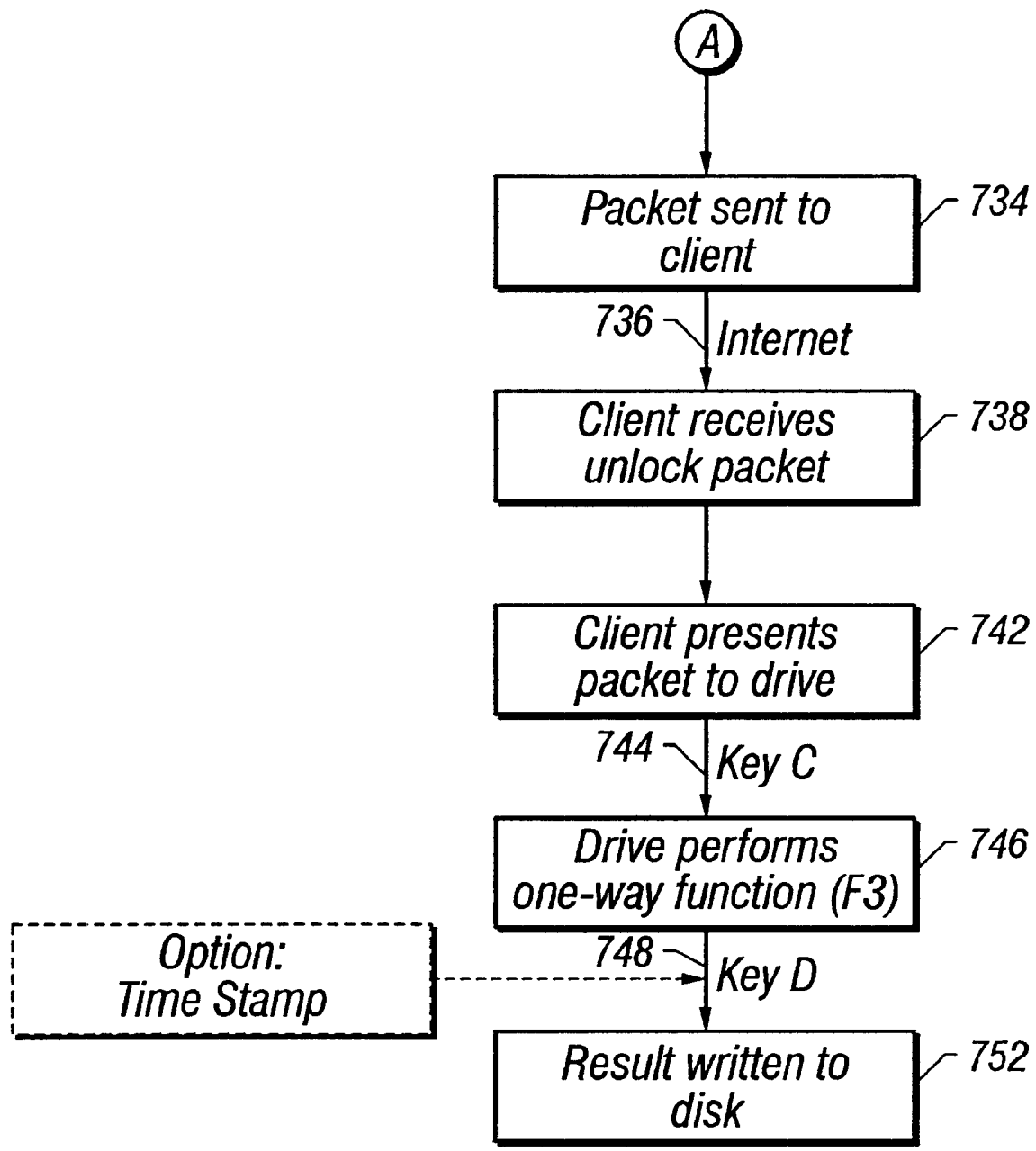

An embodiment of a content enablement process is illustrated in FIGS. 7A and 7B. In response to a first computer, such as a remote web host computer, sending a request for a first disk key 712, e.g., over the Internet 714 to a client computer, (e.g., a users home PC, or a microprocessor embedded in a personal electronic device), the client computer, in turn, sends a request for the first disk key, to the disk drive 716. The drive reads the requested disk key, which typically will be the media identifier, such as a serial number or other identifier 718. The disk key is preferably unique to the disk. The first key, in this illustration, called "key A", is read from the disk into the drive 720. The drive performs an operation or calculation ("F1") on key A 722 to yield key B 724. A number of functions can be used as F1, including a hash function. F1 is preferably a one-way function (i.e. a function which is relatively quick and easy to perform, but such that it is very difficult or time consumptive to deduce the inverse function, for recovering key A from key B, without knowing a second key). Preferably, the code for performing F1 resides substantially entirely in the drive (e.g., using a state machine or microcode). The client computer receives key B 726 and sends key B to the host computer 728, e.g., over the Internet 730, preferably using a secure connection protocol.

The host computer has access to sufficient information that it can formulate an "unlock packet" which is configured to result in recording information, on the disk, which will ultimately allow the type of disk access requested (and, typically, paid for) by the user. The "unlock packet" preferably is configured to result in storing "second information" on the disk, with the "second information" being configured such that, when appropriately combined with key A, it will yield information which the player will recognize as allowing a certain type of access. Accordingly, the "unlock packet" will differ, preferably depending on at least two factors: key A and the type of access to be provided. The "unlock packet" will take into account how the reader combines key A (or a code based on Key A) with the "second information" (or with a code based on the "second information"). It is anticipated that a wide variety, preferably substantially all, players will use the same "universal" combination procedure (so that access permission recorded on a disk will be recognized and appropriately applied, by any reader device).

In one embodiment, the host computer can obtain the first factor because it has sufficient information to recover Key A, based on key B, such as knowing the inverse function (or an appropriate decryption key) corresponding to F1. If more than one type of F1 function is in use, F1 may be, e.g., obtained from a database, available to the host, listing various inverse functions (or function parameters) corresponding to various makes, models and/or serial numbers of different disk players (in which case, the host will receive an identification of the player make, model and/or serial number, e.g. along with receiving key B).

The host computer has the second factor, because it has received information about what type of access the user has requested, and what types of codes will result in which kinds of access. For example, if the user has requested (and, presumably, paid for) access to the third track of a music disk, the computer will know what access code permits this type of access, and thus can calculate what "second information," when combined with Key A using the universal combination process, will yield this access code. If on the other hand, the user had requested a different type of access (e.g. had requested access to track 5, or access to all tracks, or time-limited or player-restricted access, or the like), different "second information" would be calculated, resulting in the desired access when combined with Key A.

In one embodiment, the host applies a second function F2 to Key A (or to Key B) 732 to produce the "unlock packet" which is then sent to the client computer 734, e.g. over the Internet 736. When the client computer receives the unlock packet 738 it presents it (or a portion or result of the unlock packet, here called "key C" 744) to the drive 742. Preferably, Key C is not in the form that will be recorded on the disk. Accordingly, in the depicted embodiment, Key C is reformed by applying a function "F3" 746, to yield Key D 748. In some embodiments, time and/or date information is appended to or encoded as part of Key D (such as when the access is date-limited). In various embodiments, F3 can be the same as F 1, can be related to F1 (such as the inverse function), or can be an unrelated function. Preferably, F3 is a one-way function. Key D is then written to the disk 752.

Figure 8:
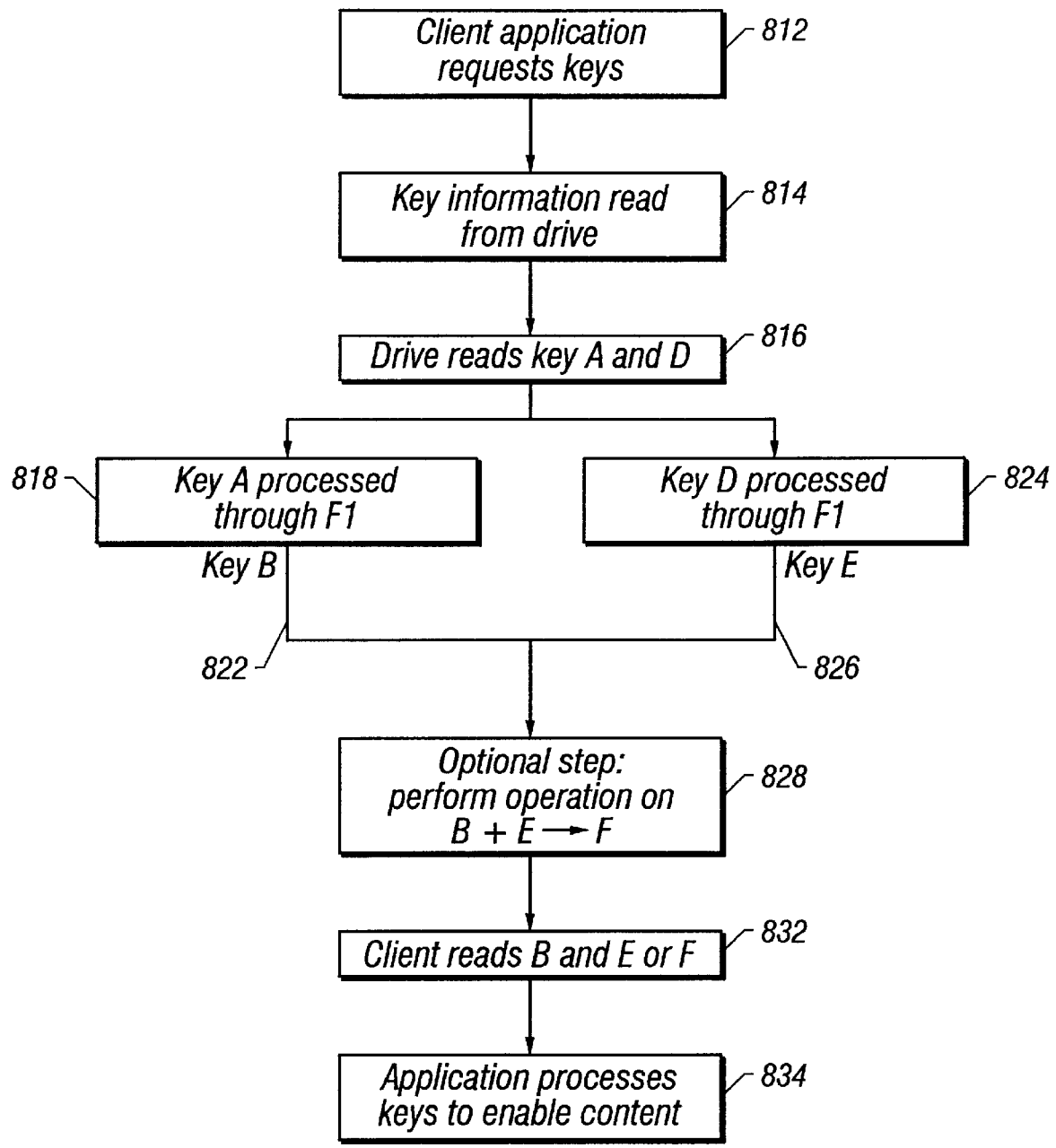
FIG. 8 is a flow chart illustrating a read process, according to an embodiment of the present invention.

As depicted in FIG. 8, when a user tries to access content from the disk, a client application requests keys 812, and the drive then performs a read 814 from the disk, indicating it needs to have keys A and D 816. The present invention allows for users to upgrade or otherwise change the level or type of access, and accordingly it is possible the disk may have several different key D's recorded thereon. Typically, the system will be configured to read the most recently-recorded Key D. In some embodiments, superseded keys may be destroyed (e.g., overwritten) and/or marked as obsolete. Although it is possible to use configurations in which direct reading of keys is permitted, e.g. for some content, preferably, the disk keys never directly appear to the host or client, i.e., the Keys A and D, in the form as stored on the disk, can not be directly combined by the "universal" combination process to yield the desired access code. This enhances security, since it will be difficult or infeasible to reverse-engineer a knowledge of the player access code scheme based on the data stored on disks. Accordingly, a function, such as F1 (which can be the same as, or related to, function F1 used in enablement 722, or can be unrelated), is applied to Key A 818, to yield Key B 822, and to key D 824, to yield Key E 826.

In the embodiment depicted in FIG. 2, in response to an indication that the royalty or license fee has been paid or arranged for 214 (e.g., in response to a communication from the host 216 over the Internet 218, or in response to a prearranged procedure such as a prearranged agreement to charge a credit card or other account, or in response to entry of a user access code) information relating to the license is recorded in the recordable area 224. The type of information which is recorded will depend on the type of license involved. For example, if the license is limited to a particular machine, the recorded information may include an identifier or profile of the machine or components thereof. If the license is limited to a particular time period, the information may include a current date or an expiration date. If the license is limited to a particular user, the information may include key 1 card or other token information, password information and the like. If the license is limited to a particular number of plays or displays, the number of plays or display may be recorded and the like.

Figure 3:
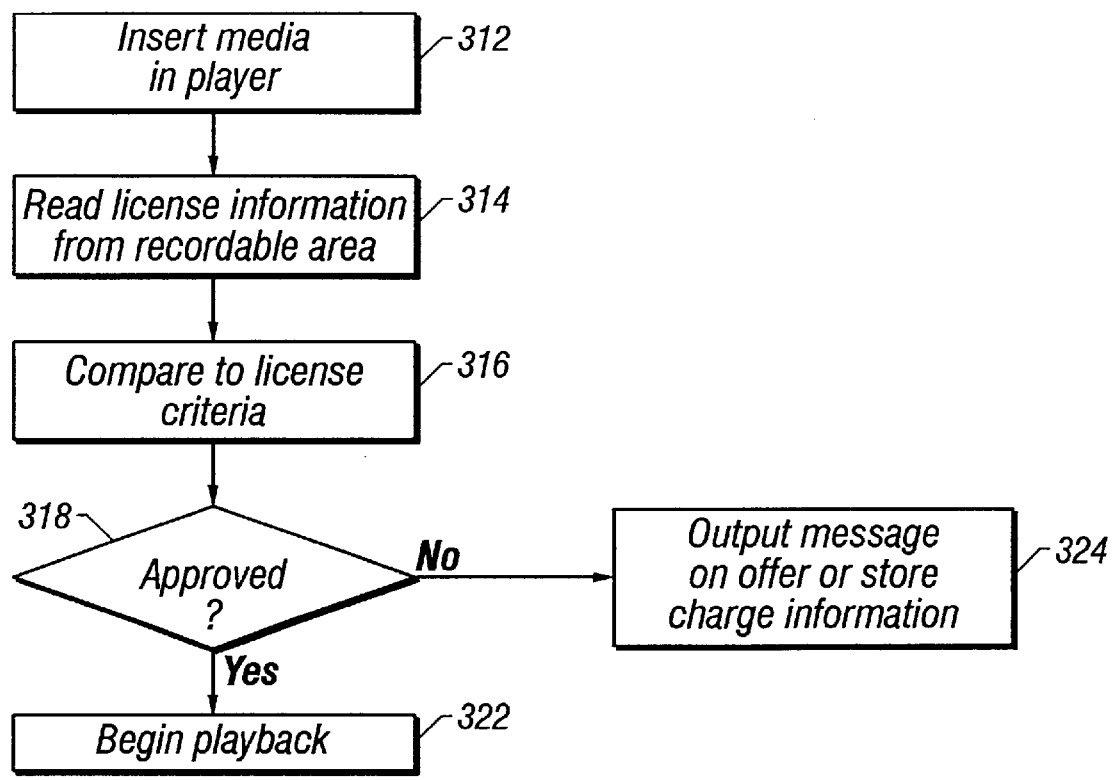
FIG. 3 is a flow chart depicting a security approval procedure according to an embodiment of the present invention.

At that point, the user may use the media in the player or playback device 226 for accessing or using the mastered and licensed content. As depicted in FIG. 3, user would typically insert the disk or similar media in the player 312 whereupon the player would read the license information from the recordable area 314. For example, the player device may read an expiration date, a total number of plays, a user password, and the like. Such read information is then compared to the license criteria 316. For example, if the license is restricted to a particular player or similar device, the player's serial number recorded on the media and read in step 314 is compared to the player's own serial number or similar information. If the comparison indicates that the access to the ICM media is approved 318, playback can begin 322. Other types of comparisons can include, for example, comparing a read expiration date to the current date, comparing a read password to an input password, comparing a maximum number of plays to a counter of executed plays and the like. In one embodiment, playback, following approval 318, involves decryption of encrypted content on the media. Preferably, the software for performing the decryption is provided on the media (e.g. as part of the ICM data). Providing the decryption (or other software related to use of the ICM data) on the disk provides a number of advantages. The user does not need to separately acquire and load decryption software (although, if desired, some or all such software may be stored on the user's machine for later user/reuse). The media can be largely platform-independent, e.g. such that, regardless of which of a plurality of book readers or other platforms the media is used in, software appropriate for accessing the content on such platform is found on the media. The user does not need to know what type of decryption software to obtain (and the user's lack of knowledge of and/or access to the decryption software is also helpful in avoiding unauthorized decryption). Different decryption or other software can be placed on different disks, to thwart unauthorized use arising from previously-broken codes and/or to provide the user with the most up-to-date software. In one embodiment, the decryption key is formed using a combination of the access code (which the user obtains for a fee) and a serial number (or other identifier) written on the media (e.g. so a second user can not gain access to content on a second disc by using the access code of the first user).

Many other systems for protection of data can be used, in addition to or in place of an encryption/decryption method as described above. In one embodiment, the protection system uses a (preferably unique) identifier of the drive device (such as providing a unique and/or random number key or similar code or identifier in a drive Read Only Memory (ROM). or made with a drive identifier), and/or a (preferably unique) identifier of the disk, either or both of which may be stored on the disk and used, e.g., as part of a system to restrict usage of a particular disk to a particular drive. For at least some media, including at least some media described in application Ser. No. 09/315,398, supra, the ICM part of the disk will display a different reflectivity than a writeable area. In one embodiment the system can be configured to block attempts to read certain types of content and/or certain disk regions, which display a reflectivity indicative of a writeable area (on the assumption that such material is legitimately available only as ICM data, and its presence in a writeable area indicates an unauthorized copy). Although is it possible to store all or part of a disk identifier, or other data used to control access, in a discrete region of the disk, such as in the writeable area, it is also possible to embed some or all such data in the ICM area (e.g., interspersed therewith, as part of or along with synchronization or error correction code (ECC) data, and the like), to make such data hard to identify and/or modify, thus thwarting attempts at unauthorized access. Writeable areas of the disk can be used to store information related to copies made, e.g., when a user is licensed to make a limited number of copies. In some embodiments, a system may be established under which blank or otherwise writeable disks can be provided with special properties, to assist in detecting unauthorized copies, such as a (preferably unique) disk identifier, providing a ICM area with an encryption key, e.g., such that a drive can only read such key if it is in a ICM area (thus thwarting attempts to copy a key from an authorized disk to a written disk), and the like.

If the comparison indicates that access to the ICM data is not approved, according to the embodiment of FIG. 3, a device may output a signal or message to the user 324 indicating that access is denied, may output an offer indicating the cost to the user, of one or more licenses which would permit access, and/or may initiate, or arrange for future initiation, of a procedure to charge the user's credit card or other account e.g. according to a predetermined arrangement.

Potential benefits from a practical and economic ICM/writeable medium or media player includes the ability to annotate, supplement, update, correct or otherwise supplement or modify the ICM data with new or additional data. Accordingly, it would be useful to provide a system apparatus and/or process which is practical and economical for both mastering of content and writing of content or other data on the same medium.

In the embodiment of FIG. 2, optionally the system may be configured to permit the user to record later-written data 228 such as by annotating, highlighting, writing notes, modifying, correcting, rearranging, remixing, editing, adding to, and the like, the ICM data. In one embodiment, the opportunity to record such material is provided without further license fee or charge. In another embodiment, some or all additional recording is provided only in response to payment of a fee. In one embodiment, the additional material may be material which is downloaded or otherwise obtained from a third party such as an author, editor or publisher of the some or all of the ICM material, an instructor or teacher, and the like. In one embodiment, some or all of the license fee may be in payment for the right to access and/or download revisions or new addition information, updates, errata, test or examination questions, answers or information, teacher's edition information and the like. In one embodiment, a student may use the media reader for accessing text book content e.g. during academic lectures and may record keyboard-input, handwritten or hand-drawn graphic input (either directly or using handwriting recognition), audio commentary, and the like, during the lecture or thereafter, e.g. for use in studying subject matter. Preferably some or all software used for writing, reading or using such later-written material is provided on the media, providing some or all of the advantages described above in connection with storing decryption or other content-access software.

According to one embodiment, when the original licensee, or another potential licensee, wishes to extend the license, e.g. to include additional time periods, to extend to additional users or readers or other machines, access additional content and the like, an additional license royalty may be charged and paid 232 e.g. including via a remote access method 234 as described above.

In response, the new or extended license information is recorded in the recordable area 236 and the media can be used in a player 238, in accordance with the extended license, e.g. using a procedure similar to that depicted in FIG. 3.

In one aspect, the present invention includes a method for controlling access to optical disc content, which includes steps of providing at least first content on each of a plurality of optical disks, the optical disks readable by at least a first optical disk reader, the disk reader being configured such that at least a first region of the optical disks are non-user accessible, the content requiring at least a first key for use; providing identifier numbers on the non-user accessible regions of the plurality of optical disks, the identifier numbers being readable by the optical disk reader, wherein no two of the plurality of disks have the same identifier number; and calculating the key, in a calculation device coupled to the reader, using both the identifier number on a first optical disk and a second number different from the identifier number, wherein use of the content is enabled. In one embodiment the second number is obtained in exchange for payment. In one embodiment, the second number is obtained using an Internet communication. In one embodiment, the optical disk includes software for establishing the Internet communication. In one embodiment, the second number is calculated at a remote site. In one embodiment, the second number is calculated using a microprocessor in the reader. In one embodiment, use of the content is selected from the group consisting of display of text, image or video data based on the content; reproduction of audio data based on the content, and copying of at least some of the content from an optical disk to another medium. In one embodiment, calculating is performed at least partially under control of software stored on the first optical disk. In one embodiment, calculating is performed at least partially under control of software downloaded using Internet communications. One embodiment further includes storing, on the first optical disk, information authorizing at least some use of the content. In one embodiment, storing includes storing on the non-user accessible region. In one embodiment, storing includes storing information selected from the group consisting of the key; a maximum number of permissible copies; a time limit for use of the content; or identification of at least one reader, to which access of the content is restricted. In one aspect, an embodiment of the invention includes a method for storing data which includes forming an optical data storage disk with at least a first data storage layer having at least first content stored in parallel on a first portion of the data storage layer; and, storing second content, different from the first content, on a second portion of the data storage layer, after the step of forming; wherein the data storage layer includes a write-once phase change material having sufficient reflectivity to allow reading of the first content. In one embodiment, storing second content includes writing data to the disk. In one embodiment, writing data includes serially writing. In one embodiment, forming an optical data storage disk having at least first content includes forming an embossed disk. In one embodiment, forming an optical data storage disk includes injection molding. In one embodiment, forming an optical data storage disk includes forming the disk as a first-surface medium. In one embodiment, forming an optical data storage disk includes forming a disk having a diameter less than about 35 mm. In one embodiment, the write-once phase change material includes InSnSb alloy. In one aspect, an embodiment of the present invention provides a data storage medium which includes at least a first data storage layer having a first portion storing parallel-stored first content and a second portion storing second content, different from the parallel-stored content, the first content including a plurality of bits having a first bit reflectivity range, the second content including a plurality of bits having a second bit reflectivity range, different from the first the bit reflectivity, the first and second bit reflectivities being different from adjacent land reflectivities in a land reflectivity range. In one embodiment, the parallel-stored first content is embossed. In one embodiment, the second content is written after the first content is formed. In one embodiment, the first reflectivity range is sufficiently distinct from the land reflectivity range that fewer than a certain percentage of sensed land reflectivities are within the first reflectivity range. In one embodiment, the second reflectivity range is sufficiently distinct from the land reflectivity range that fewer than a certain percentage of sensed land reflectivities are within the second reflectivity range. In one embodiment the first reflectivity is between about 25% and about 45%. In one embodiment, the second bit reflectivity is between about 60% and about 80%. In one embodiment, the land reflectivity is between about 40% and about 55%. Thus, in one embodiment, "1" bits of ICM data are formed as dark marks (with reflectivities less than adjacent land reflectivities) and "1" bits of later-written data are formed as bright marks (with reflectivities greater than adjacent land reflectivities). Reflectivities can, if desired, be substantially altered, e.g. to increase contrast, although possibly at the expense of decreasing absolute magnitudes, by providing one or more anti-reflective coatings. One embodiment further includes at least a first absorption coating and, if desired, the coating includes ZnS. In one aspect, the invention provides a data storage method, including reading data from at least a first optical data storage layer having a first portion storing parallel-stored first content and a second portion storing second content, different from the parallel-stored content, the first content including a plurality of bits having a first bit reflectivity range, the second content including a plurality of bits having a second bit reflectivity range, different from the first the bit reflectivity, the first and second bit reflectivities being different from adjacent land reflectivities in a land reflectivity range; and, using the reflectivities to distinguish the parallel-stored content from the second content. One embodiment further includes preventing at least some access to content which is not parallel-written content.

In one aspect, an embodiment of the invention includes an optical data storage medium with at least a first recording layer having a first region thereof containing parallel-written ICM data and a second portion thereof which is user writeable. In one embodiment, at least some of the user writeable portion is write-once. In one embodiment, at least some of the user writeable portion is re-writeable. One embodiment, further includes software, stored on the medium, configured for accessing or using at least some of the ICM data and, if desired, the software may include decryption software. In one aspect, an embodiment of the invention includes providing an optical data storage medium with at least a first recording layer having a first region thereof containing parallel-formed, ICM data and a second portion thereof which is writeable. One embodiment further includes writing data in the writeable portion prior to distribution to a user and, if desired, the data is selected from the group consisting of a serial number, a media identifier or encryption/decryption information. One embodiment further includes associating later-written content, written in the writeable portion, with selected portions of the ICM data. One embodiment further includes displaying later-written content adjacent portions of ICM data with which the later-written content is associated. One aspect of the invention includes providing a data recording medium having a first ICM data and a second writeable area; recording at least first license information in the recordable area; comparing the license information to license criteria; and permitting access to at least some of the ICM material on the basis of the comparing step. In one aspect, the invention includes a data recording medium having a first ICM data and a second writeable area; at least first license information in the recordable area; means for comparing the license information to license criteria and outputting at least a first result; and means for accessing at least some of the ICM material on the basis of the first result.

In light of the above description, a number of advantages of the present invention can be seen. The present invention provides a medium which can provide both a ICM region and a writeable region in a manner which is cost efficient and convenient. The present invention can provide a medium, especially an optical medium, which uses the same materials, components and/or layers for both a ICM, preferably parallel-recorded content and providing a writeable area. The present invention provides a medium which can store a combination of ICM and later-written material with a high date density and capacity. The present invention provides a cost effective and feasible system and apparatus for providing reliable and preferably flexible licensing for ICM proprietary intellectual property. The present invention makes it possible for text content including relatively small-distribution items such as academic textbooks, technical or other reference books and the like, to be widely available while avoiding the need for relatively costly inventory and storage associated with traditional printed book distribution. The present invention can provide text or other content with relatively low production costs, compared to the costs of a production run of a printed book. Printed books typically have a lower (but still relatively high) cost of production per unit, when larger runs are printed. This means the print book publisher must weigh the potential per-unit savings for a large run against the risk that sales will not meet expectations (incurring inventory, shipping and/or storage costs). The relatively low cost and rapid production procedures for injection-molded media means that such media can be produced in relatively small lots, with little loss compared to larger lots. Moreover, the smaller size and weight and low cost of the media means that inventory, storage and shipping costs are relatively small. Nevertheless, there has been some resistance to non-print media, arising, it is believed, from a perception that such non-print media can be readily duplicated. The present invention provides a cost effective and feasible system for distributing text, trade book, music and other content, preferably directly to consumers from publishers while avoiding unauthorized distribution and/or copying of proprietary content. The present invention provides a system making ICM data, preferably in combination with writeable capabilities, available in a relatively small form factor for both the media and the drive so as to provide a system which is feasible for personal electronic devices (PEDs), including electronic book readers. The present invention provides a medium which provides relatively high flexibility with regard to the distribution of ICM and later-written material. In one embodiment a reflective coating is provided. In one embodiment the reflective coating used in the read only area is the same reflective film as the writeable area. A unique identifying key related to the data encryption, may be written to the disk at the time of manufacture, or later. The present invention makes it possible to provide annotations or comments which stay with the media and thus are transferred with the media whenever the media is accessed, regardless of which player or device is used. The present invention can be used to provide a small and lightweight system for accessing text or other material e.g. for use by travelers, students, technicians working on-site and the like. In many prior situations, a person who annotates text (or other content) cannot effectively position or store the annotations so that they appear adjacent to, or otherwise related to, the text to which they refer. In some situations, annotations are not readily found or accessible. Aspects of the present invention provide a system, apparatus and method which provides for annotations of ICM data in such a fashion that the user can control the positioning, association and/or relationship to ICM data, and/or can readily and conveniently index, search, link, modify or otherwise use and manipulate annotations or other later-written content. In general, embodiments of the present invention can provide an apparatus, system and method which can readily provide for accounting or payment of royalties for proprietary intellectual property and/or provide annotations, updates, supplements, corrections or other later-written, i.e., (not ICM) content in a fashion which is practical and economical. Embodiments of the present invention can provide apparatus, systems and methods for playing or reproducing both prerecorded and later-written content or data, on such medium in a manner which is economical, lightweight, small and otherwise convenient. The present invention can advantageously provide an apparatus for use in connection with such medium which is sufficiently small and lightweight as to be practical for use in or with a personal electronic device (PED).

A number of variations and modifications of the invention could be used. It is possible to use some features of the invention without using others. For example, it is possible to use the systems and procedures for providing desired licenses or access without using the particular media and/or drives described herein or in application Ser. No. 09/315, 398, supra. It is possible to provide writeable areas used in connection with controlling licenses or access or royalty payments without providing for user-controlled writing e.g., annotations and the like and vice versa. It is possible to provide media that includes both ICM areas and writeable area without using the same structure, material, layers and the like for the two areas. In some embodiments, some or all of the ICM material may be re-writeable and/or erasable. In some embodiments, it is desired to permit accessing the ICM data in any suitable playback device so that the data is not limited to a particular player. In some embodiments, electronic text books or other content can be viewed or accessed with any or all of a number of devices including, e.g., a personal digital assistant (PDA), portable computer or electronic book reader. Preferably, notes, highlights, bookmarks, cross references, annotations and the like may be included in the text material for later printout or review. In some embodiments, keys embedded in the reader unit and/or the media can control portability. The later-written annotations or other material may be provided to later users and/or may be made inaccessible to later users. In one embodiment, a reader or other device can be configured for displaying the amount of unused writeable area remaining e.g., such that later users or licensees will know how much additional annotation or other additional information can still be recorded. The storage capacity of the media can be used for storing numerous items, including, without limitation, any or all of a plurality of different books or other works on a single disk, Audio, video or image content, provision of one or more books (or other works) in multiple forms, such as in complete or abridged versions, two or more different languages (or providing other multiple language support), providing reader assistance such as dictionary information, e.g. for words included in the works, historical or other related information, thesaurus services and the like, commentaries by the author, critics, other readers, literary criticism, commentary or explanations, advertising, excerpts from other works (or other "teasers"), audio annotations and other items. The writeable area of the media can be used for numerous items, including, without limitation, any or all of codes, programming data or the like for use in unlocking all or part of the other ICM and/or later-written material (e.g., unlocking selected ones of multiple books on a disk), either for unlimited future use or time-limited use (e.g., to effect leasing of disk content for a period), storing keyboard-entered, handwritten, audio or other user notes or commentary, instructional, pedagogical or academic content, such as course syllabi, teacher notes, tests, supplemental material, which in some embodiments may be downloaded or otherwise acquired at the beginning of a course, book updates or corrections (e.g., errata), creating or storing a custom book collection, storing of personal settings, preferences, bookmarks and the like, updating or correcting reference works such as catalogs, user manuals, atlases, travel guides phone directories and the like (e.g., so that a user can have access to an up-to-date resource by downloading only corrections, i.e. without having to download an entire new edition). A number of systems and procedures can be used for obtaining a decryption key or other access code (e.g., in exchange for a payment), including, without limitation, by telephone, by the Internet or similar communications system, in a bookstore or other traditional retail location, in a classroom (e.g., for textbooks), through a system of kiosks, and/or by buying or otherwise obtaining pre-unlocked disks.

The present invention, in various embodiments, includes components, methods, processes, systems and/or apparatus substantially as depicted and described herein, including various embodiments, subcombinations, and subsets thereof Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. The present invention includes items which are novel, and terminology, adapted from previous and/or analogous technologies, for convenience in describing novel items or processes, does not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for controlling access to optical disc content, comprising:

providing at least first content on each of a plurality of optical disks, said optical disks readable by at least a first optical disk reader, said disk reader being configured such that at least a first region of said optical disks are non-user accessible, said content requiring at least a first key for use;

providing identifier numbers on said non-user accessible regions of said plurality of optical disks, said identifier numbers being readable by said optical disk reader, wherein no two of said plurality of disks have the same identifier number;

calculating said key, in a calculation device coupled to said reader, using both said identifier number on a first optical disk and a second number different from said identifier number, wherein use of said content is enabled if said key indicates that access to said content should be permitted.

2. A method, as claimed in claim 1, wherein said second number is obtained in exchange for payment.

3. A method, as claimed in claim 1, wherein said second number is calculated at a remote site.

4. A method, as claimed in claim 1, wherein said second number is calculated using a microprocessor in said reader.

5. A method, as claimed in claim 1 wherein said use of said content is selected from the group consisting of:

display of text, image or video data based on said content reproduction of audio data based on said content, and copying of at least some of said content from an optical disk to another medium.

6. A method, as claimed in claim 1, wherein said step of calculating is performed at least partially under control of software stored on said first optical disk.

7. A method, as claimed in claim 1, wherein said step of calculating is performed at least partially under control of software downloaded using Internet communications.

8. A method, as claimed in claim 1, wherein said calculating comprises using a hash number.

9. A method, as claimed in claim 1, wherein said calculating comprises prime number multiplication.

10. A method, as claimed in claim 1, wherein said calculating comprises compound number factoring.

11. A method, as claimed in claim 1, wherein use of said content is enabled by enabling a decryption process.

12. A method, as claimed in claim 1, wherein said second number is obtained using an Internet communication.

13. A method, as claimed in claim 12, wherein said optical disk includes software for establishing said Internet communication.

14. A method, as claimed in claim 1, further comprising storing, on said first optical disk, information authorizing at least some use of said content.

15. A method, as claimed in claim 14 wherein said step of storing comprises storing on said non-user accessible region.

16. A method, as claimed in claim 14, wherein said step of storing comprises storing information selected from the group consisting of:
   said key;
   a maximum number of permissible copies;
   a time limit for use of said content; or
   identification of at least one reader, to which access of said content is restricted.

17. A method, as claimed in claim 1, wherein said key does not indicate that access to said content should be permitted, said method further including a registration process that comprises:
   requesting user information;
   using an application program interface to present key and content information to a host computer;
   downloading an applet from said host computer;
   causing said applet to read said identifier number on said first optical disk;
   transmitting said identifier number to said host computer;
   causing said host computer to calculate a payment amount and an access key;
   transmitting said access key to said application program interface; and
   writing information relating to said access key to said first optical disk.

18. A method, as claimed in claim 17, wherein writing information relating to said access key comprises writing a value of said access key.

19. A method, as claimed in claim 17, wherein writing information relating to said access key comprises writing a hash function.

20. A method, as claimed in claim 17, wherein writing information relating to said access key comprises writing in a non-copyable zone of said first optical disk.

21. A method, as claimed in claim 17, comprising removing said applet.

22. A method for storing data comprising:
   forming an optical data storage disk with at least a first data storage layer having at least first content stored in parallel on a first portion of said data storage layer;
   storing second content, different from said first content, on a second portion of said data storage layer, after said step of forming;
   wherein said data storage layer comprises a write-once phase change material having sufficient reflectivity to allow reading of said first content.

23. A method as claimed in claim 22 wherein said step of storing second content comprises writing data to said disk.

24. A method as claimed in claim 22 wherein said writing data comprises serially writing.

25. A method as claimed in claim 22 wherein said step of forming an optical data storage disk having at least first content comprises forming an embossed disk.

26. A method as claimed in claim 22 wherein said step of forming an optical data storage disk includes injection molding.

27. A method as claimed in claim 22 wherein said step of forming an optical data storage disk comprises forming said disk as a first-surface medium.

28. A method, as claimed in claim 22 wherein said step of forming an optical data storage disk comprises forming a disk having a diameter less than about 35 mm.

29. A method, as claimed in claim 22, wherein said write-once phase change material comprises InSnSb alloy.

30. A data storage medium comprising:
   at least a first data storage layer having a first portion storing parallel-stored first content and a second portion storing second content, different from said parallel-stored content, said first content comprising a plurality of bits having a first bit reflectivity range, said second content comprising a plurality of bits having a second bit reflectivity range, different from said first said bit reflectivity, said first and second bit reflectivities being different from adjacent land reflectivities in a land reflectivity range.

31. A data storage medium, as claimed in claim 30, wherein said parallel-stored first content is embossed.

32. A data storage medium, as claimed in claim 30, wherein said second content is written after said first content is formed.

33. A data storage medium, as claimed in claim 30, wherein said first reflectivity range is sufficiently distinct from said land reflectivity range to permit automatic differentiation between land areas and bits of said first content.

34. A data storage medium, as claimed in claim 30, wherein said second reflectivity range is sufficiently distinct from said land reflectivity range to permit automatic differentiation between land areas and bits of said second content.

35. A data storage medium, as claimed in claim 30, wherein said first and second reflectivity ranges are sufficiently distinct from one another to permit automatic differentiation between said first portion and said second portion.

36. A data storage medium, as claimed in claim 30 wherein said first reflectivity is between about 25% and about 45%.

37. A data storage medium, as claimed in claim 30 wherein said second bit reflectivity is between about 60% and about 80%.

38. A data storage medium, as claimed in claim 30, wherein said land reflectivity is between about 40% and about 55%.

39. A data storage medium, as claimed in claim 30, further comprising at least a first absorption coating.

40. A data storage medium, as claimed in claim 39, wherein said coating comprises ZnS.

41. A data storage method, comprising:
   reading data from at least a first optical data storage layer having a first portion storing parallel-stored first content and a second portion storing second content, different from said parallel-stored content, said first content comprising a plurality of bits having a first bit reflectivity range, said second content comprising a plurality of bits having a second bit reflectivity range, different from said first said bit reflectivity, said first and second bit reflectivities being different from adjacent land reflectivities in a land reflectivity range;
   using said reflectivities to distinguish said parallel-stored content from said second content.

42. A data storage method, as claimed in claim 41, further comprising:
   preventing at least some access to content which is not parallel-written content.

43. A method of enabling content requested by a user on an optical disk comprising:
   causing a host computer to send a request for a first disk key;

causing a disk drive to read said first disk key, said first disk key being stored on said optical disk;

performing a first function on said first disk key to generate a second disk key;

transmitting said second disk key to said host computer;

causing said host computer to formulate an unlock packet;

using said unlock packet to generate second information; and storing said second information to said optical disk, the combination of said first disk key and said second information stored on said optical disk indicating that said content may be accessed.

44. A method, as claimed in claim 43, comprising causing a host computer to send said request for a first disk key to a client computer and causing said client computer to send said request for a first disk key to said disk drive.

45. A method, as claimed in claim 43, wherein said first disk key is a serial number or other media identifier.

46. A method, as claimed in claim 43, wherein said first function is a hash function.

47. A method, as claimed in claim 43, wherein said first function is a one-way function.

48. A method, as claimed in claim 43, wherein performing a first function on said first disk key to generate a second disk key is done using code that is substantially entirely resident in said disk drive.

49. A method, as claimed in claim 43, wherein transmitting said second disk key to said host computer is done over the Internet.

50. A method, as claimed in claim 43, comprising destroying or overwriting previously recorded second information.

51. A method, as claimed in claim 43, wherein the host computer determines the first disk key by applying an inverse of the first function to the second disk key.

52. A method, as claimed in claim 51, comprising providing the host computer with information regarding the make, model number and/or serial number of the disk drive along with the second disk key, thereby permitting the host computer to identify the inverse of the first function.

53. A method, as claimed in claim 51, wherein said unlock packet is formulated based on the identity of said content requested by said user.

54. A method of reading content enabled by the method claimed in claim 43 comprising:

reading said first disk key and said second information;

applying a second function to said first disk key to yield a third disk key; and applying a third function to said second information to yield a fourth disk key.

55. A method, as claimed in claim 54, comprising reading and processing said third and fourth disk keys.

56. A method, as claimed in claim 54, comprising applying a fourth function to said third disk key and said fourth disk key to yield a fifth disk key.

57. A method, as claimed in claim 56, wherein said fourth function comprises a hash function.

58. A method, as claimed in claim 56, wherein said fourth function comprises an exclusive OR combination.

59. A method, as claimed in claim 56, comprising reading and processing said third and fifth disk keys.

60. A method, as claimed in claim 43, wherein causing said host computer to formulate an unlock packet comprises applying a second function to said second disk key.

61. A method, as claimed in claim 60, comprising presenting at least a portion of the unlock packet to the disk drive.

62. A method, as claimed in claim 61, comprising applying a third function to the at least a portion of the unlock packet to yield a third disk key, said second information comprising said third key.

63. A method, as claimed in claim 62, wherein applying a third function to the at least a portion of the unlock packet comprises including time and/or date information as a part of the third disk key.

64. A method, as claimed in claim 62, wherein said first function is the same as said third function.

65. A method, as claimed in claim 62, wherein said first function is the inverse of said third function.

66. A method, as claimed in claim 62, wherein said third function is a one-way function.

* * * * *